(12) United States Patent
Cheung et al.

(10) Patent No.: US 7,426,703 B2
(45) Date of Patent: Sep. 16, 2008

(54) HIERARCHICAL NAVIGATION LAYERS FOR WIZARDS

(75) Inventors: Chun Ho Cheung, Bellevue, WA (US);
Nicholas R. Leggett, Seattle, WA (US);
Seung-Yup Chai, Redmond, WA (US);
Stephen T. Owen, Kirkland, WA (US);
Peter Wassmann, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 635 days.

(21) Appl. No.: 10/649,424

(22) Filed: Aug. 27, 2003

(65) Prior Publication Data

US 2005/0050438 A1 Mar. 3, 2005

(51) Int. Cl.
*G06F 3/048* (2006.01)
(52) U.S. Cl. .................................. 715/854; 715/853
(58) Field of Classification Search ................ 715/854, 715/500, 853; 717/165, 108; 700/83; 707/1
See application file for complete search history.

(56) References Cited

U.S. PATENT DOCUMENTS

| | | | | |
|---|---|---|---|---|
| 5,822,745 | A * | 10/1998 | Hekmatpour | ................. 706/59 |
| 5,859,637 | A | 1/1999 | Tidwell, II | |
| 6,268,853 | B1 * | 7/2001 | Hoskins et al. | ............... 700/83 |
| 6,496,842 | B1 * | 12/2002 | Lyness | ........................ 715/514 |
| 6,502,234 | B1 | 12/2002 | Gauthier et al. | |
| 6,564,375 | B1 * | 5/2003 | Jiang | ........................... 717/165 |
| 6,574,791 | B1 | 6/2003 | Gauthier et al. | |
| 7,089,500 | B2 * | 8/2006 | Li | ............................... 715/763 |
| 7,272,818 | B2 * | 9/2007 | Ishimitsu et al. | ............ 717/108 |
| 2002/0002546 | A1 | 1/2002 | Doerr et al. | |
| 2002/0116363 | A1* | 8/2002 | Grainger | ........................ 707/1 |
| 2002/0118225 | A1 | 8/2002 | Miksovsky | |
| 2003/0043187 | A1* | 3/2003 | Li | ............................... 345/749 |
| 2003/0048300 | A1 | 3/2003 | Li | |
| 2003/0081002 | A1 | 5/2003 | De Vorchik et al. | |
| 2003/0093755 | A1* | 5/2003 | O'Carroll | .................... 715/500 |
| 2003/0160829 | A1 | 8/2003 | Miksovsky et al. | |

* cited by examiner

*Primary Examiner*—Ba Huynh
*Assistant Examiner*—Shashi K Becker
(74) *Attorney, Agent, or Firm*—Lee & Hayes, PLLC

(57) ABSTRACT

Navigational functionality is abstracted from user interface pages associated with a wizard and allocated to a navigation module. The navigation module provides a hierarchical tree of nodes representative of the user interface pages in the wizard. In operation, a token is transmitted from a user interface page to the navigation module when a user activates a user interface control within the user interface pages. The token instructs the navigation module to traverse the hierarchical tree to determine a successor page to present to the user, such as a next user interface page, a previous user interface page, a user interface page defining a selected branch, and so on. Abstracting navigational information from individual user interface pages is advantageous because it simplifies the design and modification of user interface pages, as well as promotes the modularity and portability of the user interface pages.

23 Claims, 11 Drawing Sheets

HIERARCHICAL NAVIGATION LAYERS FOR WIZARDS

TECHNICAL FIELD

This invention relates to a user interface that assists a user in completing a task via a sequence of user interface pages. In a more particular implementation, this invention relates to navigation functionality used in a wizard-type user interface.

BACKGROUND

A wizard-type user interface (or simply "wizard" for brevity) refers to a user a interface that assists a user in completing a task via one or more user interface pages. The user interface pages establish a mechanism for interacting with the user through which the user enters and/or receives information in an ordered sequence of steps. Hence, wizards are particularly useful in guiding a user in completing a complex task that might otherwise be difficult for the user to perform in unassisted fashion. Wizards have been applied to many different kinds of tasks. For instance, wizards are commonly used to create or configure various objects, format various objects (such as tables or paragraphs), and so on.

FIG. 1 shows an exemplary wizard 100 that includes six pages (102-112). A first page 102 includes a title bar 114 that identifies the purpose of the wizard 100. That is, the title bar 114 provides a caption that identifies the main task performed by the wizard 100 (in this case, "Wizard Task XYZ"). The first page 102 also commonly includes additional introductory information 116 that describes the purpose of the wizard 100. User interface control buttons 120 and 122 provide navigation functionality used to navigate though the wizard 100. The "next" button 120 advances to a subsequent page in the sequence of pages provided by the wizard 100. A cancel button 122 aborts the wizard 100 without sequencing through the remainder of the pages. Further, in later-displayed pages, a "back" button is used to advance to a preceding page in the sequence of pages provided by the wizard 100.

The wizard 100 displays the second page 104 when the user activates the "next" button 120 of the first page 102. The second page 104 and subsequent pages typically prompt the user to make various selections, enter requested information, or perform other actions in an ordered sequence of steps. These pages commonly include a title section that identifies the respective subtasks assigned to the pages For instance, the second page 104 includes a title section 124 that identifies the purpose of the second page 104. The second page 104 also includes a main body section that includes prompting information 126. The prompting information 126 consists of text and/or graphics that prompts the user to perform some action. The second page 104 also includes one or more controls used to receive the user's input. The second page 104 specifically shows the exemplary use of a data entry box 128 for entering textual information in response to the prompting information 126. However, wizard pages typically draw from a wide variety of user interface controls to receive information from users. For example, the third page 106 uses a check box 130 to receive the user's selection. The fourth wizard page 108 uses radio buttons 132 (also know as option buttons) to receive input from the user. Both check boxes 130 and radio buttons 132 are useful for allowing the user to make binary-type selections (e.g., YES/NO-type selections) and/or to select one or more items in a list of items, to name just two exemplary common uses. Still other forms of user interface controls can be used to collect information from users, such as drop-down menus, scrollable selection fields, hypertext fields, and so on.

Many wizards sequence through pages in a singular and fixed order. That is, as shown in FIG. 1, the second page 104 necessarily follows the first page 102, the third page 106 necessarily follows the second page 104, and the fourth page 108 necessarily follows the third page 106. However, other wizards may deviate from this strict sequence in various ways. For example, in the example of FIG. 1, the fourth page 108 prompts the user to select between option A and option B. If the user selects option A, then the wizard 100 will advance to the fifth page 110 via path 134. If the user selects option B, then the wizard 100 will advance to the alternative fifth page 136 via the path 138. Other wizards may employ more complex branching scenarios, for example, presenting more than two choices. Other variations on the strict sequential ordering of wizard pages are possible. Navigation through some wizards ultimately resolves into a predetermined number of well-defined page sequences Other wizards can provide a more dynamic and open-ended set of navigational options to the user.

Finally, a sixth page 112 represents the terminal page in the wizard 100. The final page 112 commonly employs closing information 140 that presents various concluding remarks. The user can exit the wizard 100 at this point by activating a "finish" button 142.

FIG. 2 shows a technique for linking wizard pages together. Each wizard page typically includes logic associated therewith. Among other information, the logic can include program code that governs the behavior of each page, as well as formatting information that specifies the visual appearance of each page. In FIG. 2, an exemplary wizard 200 includes a first page having logic 202 associated therewith, a second page having logic 204 associated therewith, a third page having logic 206 associated therewith, and an nth page having logic 208 associated therewith. In the technique shown in FIG. 2, instructions used to carry out the linking between pages are embedded within the logic associated with individual pages. For example, logic 202 includes instructions 210 used to sequence to the second page. Logic 204 includes instructions 212 used to return to the first page, and instructions 214 used to advance to the third page. Logic 206 includes instructions 216 used to return to the second page, and instructions 218 used to advance to the nth page. Logic 208 includes instructions 220 used to return to a preceding page, and instructions 222 used to terminate the wizard 200.

The above-described technique suffers from a number of drawbacks. For example, the technique makes it difficult to modify the wizard 200. For example, suppose that a developer wanted to replace one or more pages in the wizard 200 with updated pages. This would require the developer to determine the linking information used in the original pages (e.g., the "back" and "next" instructions) and duplicate this linking information in the updated pages. In addition, the developer must review the existing pages in the wizard (i.e., the pages that have not been modified) to determine if they contain reference to any new or updated pages. If so, these pages may need to be modified to ensure that they link correctly to the new or updated pages. These editing tasks may be burdensome as well as susceptible to coding errors, as it requires the developer to delve into the code used in individual pages to ensure that the pages are threaded together in a desired manner. The technique shown in FIG. 2 also makes it difficult for a developer to export portions of one wizard into other wizards. More specifically, a series of pages from one wizard cannot be simply "plugged" into another wizard. Rather, using the technique of FIG. 2, the developer must modify the code associated with individual pages such that newly added pages properly link to existing pages in the other wizard; more specifically, this task may require the developer to modify both the code associated with the newly added pages and the code associated the existing pages in the other wizard. Again, this page specific implementation of linking behavior can be tedious and susceptible to coding errors.

As such, there is an exemplary need in the art for a more efficient technique for implementing the linking between pages in a wizard-type user interface.

SUMMARY

According to one exemplary implementation, an apparatus is described for presenting a sequence of user interface pages to a user, commonly known as a wizard When the user activates a user interface control associated with one of the user interface pages within the sequence, the apparatus sends a token to a navigation module. The navigation module includes a hierarchical tree of nodes that represent the sequence of user interface pages in the wizard. Some of the nodes represent user interface pages, whereas other nodes represent respective collections of user interface pages. The navigation module receives the token and, in response thereto, traverses the hierarchical tree to identify what user interface page should be displayed next. The identified user interface page is then presented to the user. This procedure is repeated for each navigable user interface page in the wizard.

Performing navigation using a tree-based navigation module allows a developer to design and modify user interface pages in an efficient, flexible, and convenient manner The use of the above-described navigation module also facilitates the export of groups of user interface pages to other wizards.

A related method, computer readable media, and data structure are also described herein.

Figure 1:
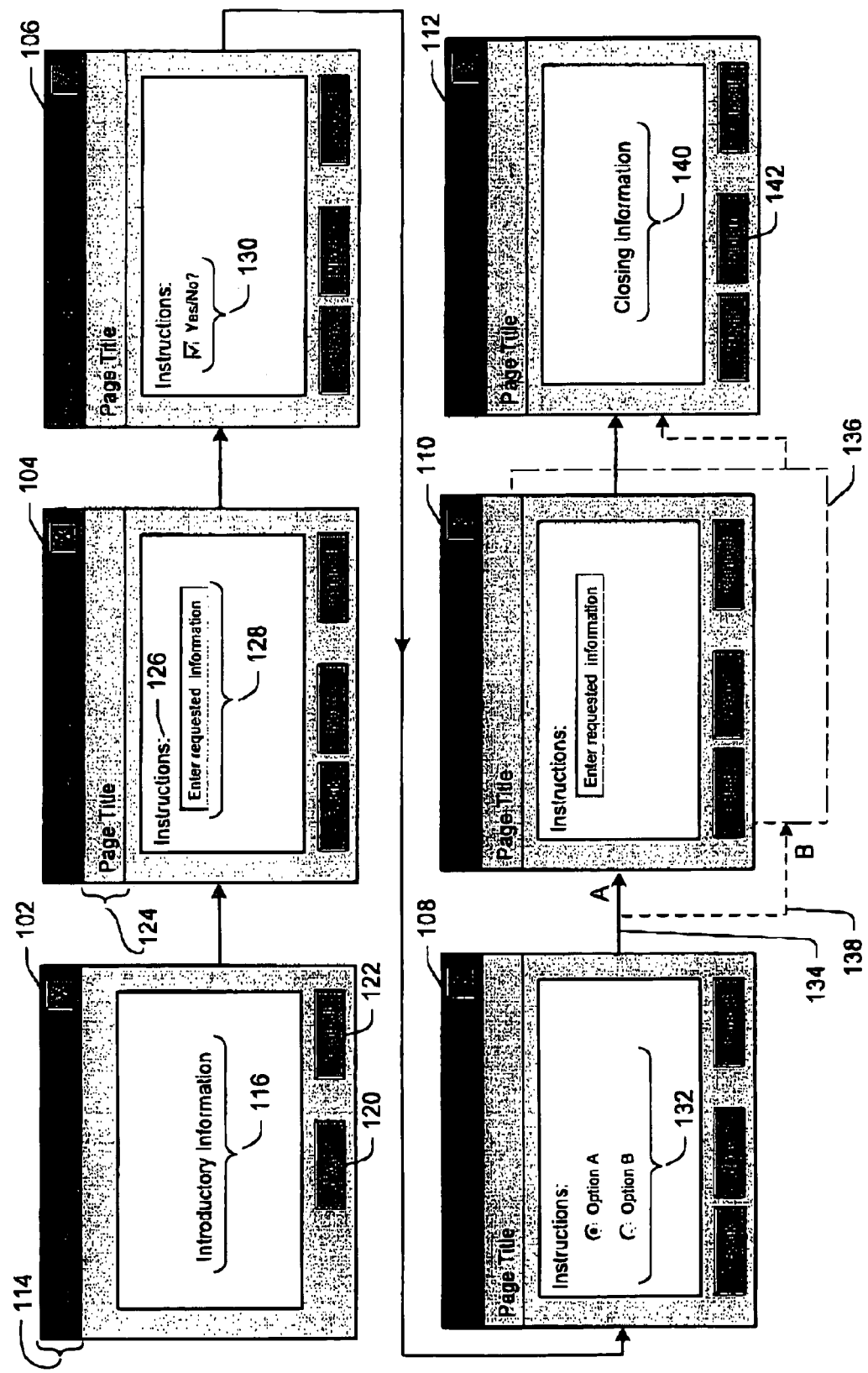
FIG. 1 shows a series of pages provided by an exemplary type of wizard user interface having various disadvantages identified in the Background section.
Figure 2:
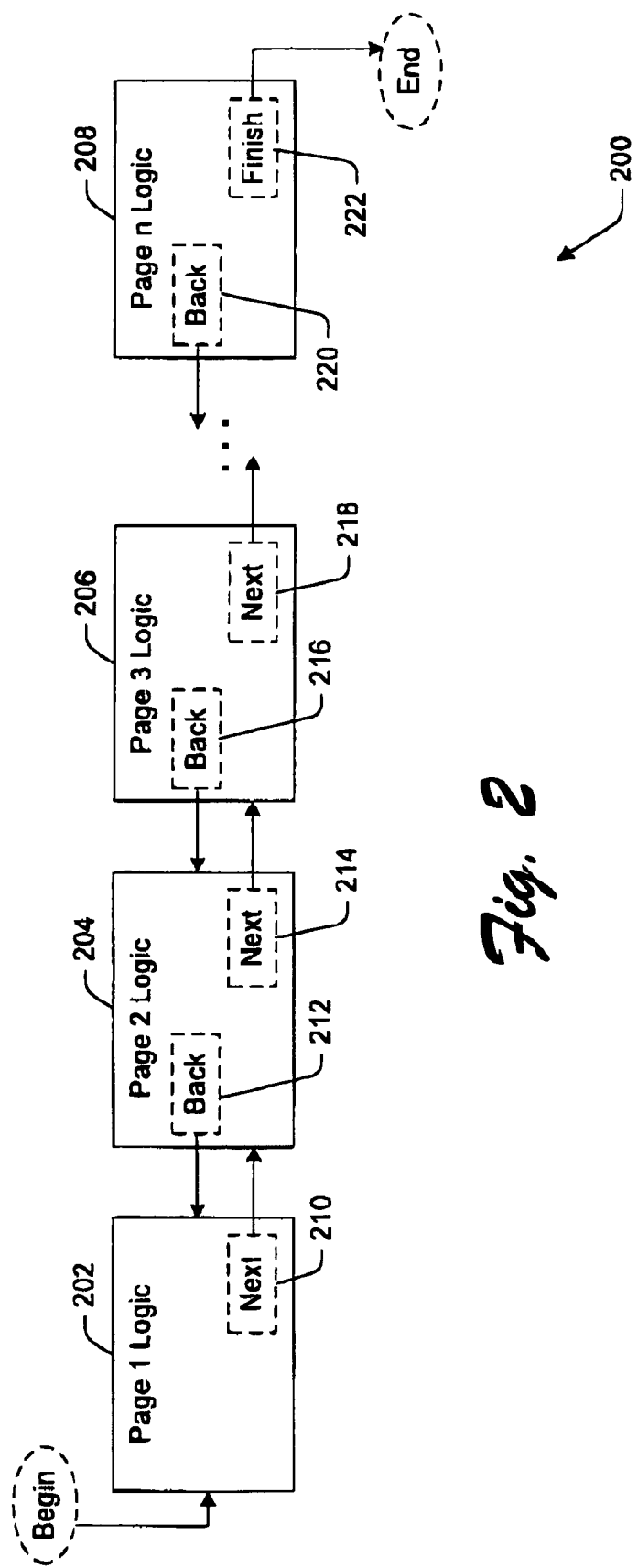
FIG. 2 shows a technique for linking pages in the type of wizard user interface illustrated in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure pertains to a navigational mechanism that governs the behavior of a user interface. The user interface can include one or more pages. The pages can be graphical pages, text pages, or some other kind of pages. In a multi-page implementation, the pages are linked together by linking paths. In one implementation, a singular and unalterable linking path binds the pages of the user interface together. That is, in this case, a user can move forward and backward through the user interface pages along one path. In other implementations, the user interface can incorporate paths that permit deviation from a strict linear ordering of paths, such as by allowing branching, optional selection of pages, and so on. Some user interfaces may be structured in such a way that the total number of different paths that can be taken through the user interface is definable and fixed; other user interfaces can be generated in a more dynamic manner to provide an essentially open-ended number of navigational options The user interface can be applied to any end use. In a typical application, the user interface is used to assist a user in performing a task. In this case, the pages provided by the user interface typically will contain both instructions that prompt the user to perform various actions, and various respective controls that allow the user to perform the actions. In this environment, the user interface is commonly referred to as a "wizard " Accordingly, to facilitate discussion, the term "wizard" will be used henceforth to describe the user interface However, it should be noted that the principles described here have application to other kinds of user interfaces that are not commonly thought of as wizards. For example, the principles can be applied to web-page type navigation mechanisms in which the user navigates through a series of web pages by activating hyper-text links presented on the pages.

This disclosure is organized as follows. Section A of this disclosure describes an exemplary design strategy used to govern navigation in a wizard. Section B describes an exemplary implementation of the design strategy discussed in Section A. And Section C describes an exemplary method of operation of the design strategy described in Section A.

A. Exemplary Design Strategy

Overview of Design Strategy

Figure 3:
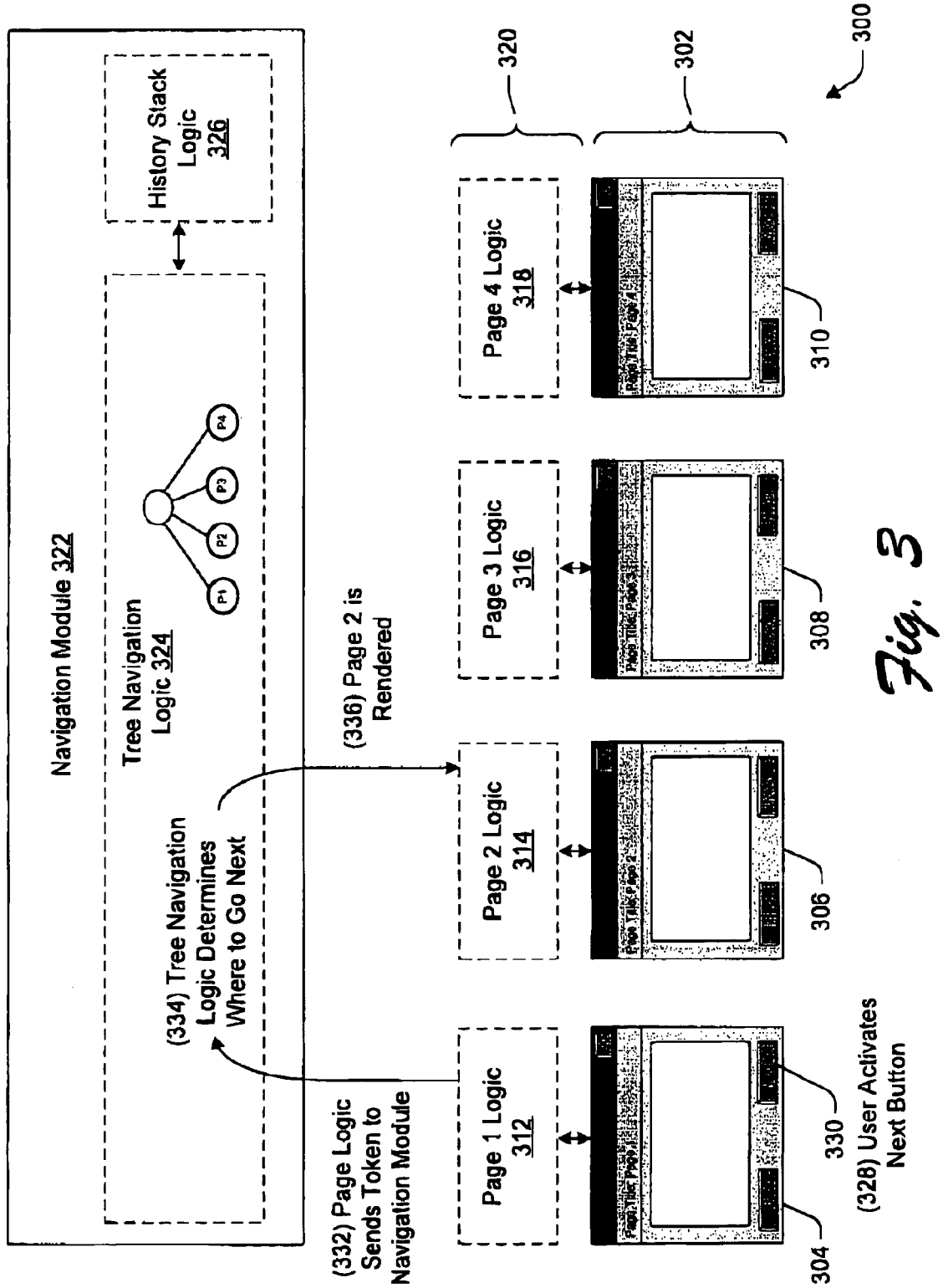
FIG. 3 shows an exemplary design strategy for linking pages, particularly illustrating a technique for advancing to a subsequent page upon activation of a "next" button.

FIG. 3 shows an overview of a wizard design strategy 300 for separating the high-level navigational aspects of a wizard from other aspects of the wizard. To facilitate discussion, FIG. 3 illustrates a relatively simple wizard UI 302 comprising four pages presented in a fixed linear sequence. More specifically, the wizard includes a first page 304, a second page 306, a third page 308, and a fourth page 310—presented in that order. The first page 304 has logic 312 associated therewith, the second page 306 has logic 314 associated therewith, the third page 308 has logic 316 associated therewith, and the fourth page 310 has logic 318 associated therewith. The logic (312-318) associated with individual pages can be collectively referred to as local page functionality 320. The wizard design strategy 300 also includes a navigation module 322 that interacts with the local page functionality 320.

By way of overview, the local page logic 320 governs the behavior and visual appearance of the individual pages provided in the wizard The local page logic 320 also handles relatively local-level aspects of the navigational behavior of the pages. However, the local page logic 320 does not globally specify how the pages in the wizard are linked together; rather, it is the role of the navigation module 322 to handle the global navigational aspects of the wizard. For instance, in a branching wizard, the local page logic 320 may include local navigational logic to the extent that it permits a user to select between option A and option B. Yet such local navigational logic does not identify what specific pages are displayed in response to the user's selection; it is the navigation module 322 which performs this global identification in cooperation with the local logic page logic 320.

In operation, the local page logic 320 passes a token to the navigation module 322 when the user makes a navigation-related request, such as when the user activates a "next" button or "back" button. A "token" is used broadly here to represent any type of information expressed in any format that can be transmitted from the local page logic 320 to the navigation module 322. For instance, a token can be a parameter, a collection of parameters, a data structure that provides such parameters, or other type of information. In one case, the token simply indicates that the user has activated a particular type of navigational button within the context of a particular page. In response, the navigation module 322 determines what page should be displayed next. The wizard design strategy 300 thereafter presents the identified next page to the user. The above-described procedure is repeated for each navigable user interface page in the wizard. This procedure terminates when the user reaches a terminal wizard page and activates a "finish" button provided by that page.

Separating the high-level navigational aspects of the wizard from other aspects of the wizard has notable benefits. The logic associated with individual wizard pages can be designed without reference to the overall scheme of navigation between pages in the wizard. This, in turn, makes it easier for developers to modify and replace wizard pages. The wizard design strategy 300 also allows developers to export collections of wizard pages from one wizard to another without having to perform burdensome editing of individual pages. These features enable a more modular and flexible approach to the design and manipulation of wizard pages than heretofore provided in the art.

A more detailed discussion of the wizard design strategy 300 is provided below with reference to FIGS. 3-8, The local page functionality 320 can implement both the behavior and the visual appearance of the pages (304-310) in the wizard. To achieve this end, the local page functionality 320 can use any combination of techniques, such as declarative-type techniques (e.g., using a markup language) and programming-type techniques (e.g., using a programming language containing script code, etc.). For instance, a HyperText Markup Language (HTML) document can be used to convey the visual appearance of a wizard page. An HTML document contains tags corresponding to presentation-related fields in the document. The HTML document, in turn, can be based on an underlying extensible Markup Language (XML) document. An XML document contains tags corresponding to a subject matter-related fields in the document. An XML document can be transformed into an HTML document using so-called style sheets provided by Extensible Stylesheet Language Transformation (XSLT). Behavioral aspects of the local page logic 320 can be expressed using any kind of programming language, such as JScript™ scripting language, C/C++, etc. It is also possible to specify the behavior of the wizard pages in a declarative manner, e.g., using a markup language.

The page logic (312-318) of the local page functionality 320 is shown as comprising distinct and unified blocks of functionality to facilitate discussion. However, the logic in the local page functionality 320 can be implemented as a hierarchical tree of separate objects, In this implementation, common behavior or visual aspects of the pages can be abstracted out to parent objects in the hierarchy. In this context, the label "local" assigned to the local page functionality 320 is used mainly to highlight the fact that the wizard allocates the navigational aspects of the wizard to the navigation module 322, thus separating the navigational aspects of the wizard from so-called "other aspects" of the wizard; such "other aspects" of the wizard are generically grouped and referred to as the local page functionality 320.

The navigation module 322 itself includes tree navigation logic 324. The tree navigation logic 324 represents the pages in the wizard using a hierarchical tree structure. In this structure, a root node conceptually represents an entire collection of pages presented by the wizard. The next lower hierarchical level in the tree may include one or more so-called collection nodes or page nodes. A collection node presents a subset of pages presented in the wizard. For instance, a wizard may coordinate interaction with the user in a series of stages that correspond to different subtopics. In this case, the navigation module 322 can devote separate collection nodes to each of these subtopics. A collection node may, in turn, include one or more additional collection nodes, In contrast, a page node directly represents a user interface page presented by the wizard. For example, a root node or a collection node may include one or more page node children associated therewith. As shown in FIG. 3, the tree navigation logic 324 provides a hierarchical tree having a root collection node and four page leaf nodes corresponding to the four respective pages in the wizard.

As will be described in greater detail in the context of FIG. 5, the navigation module 322 can provide different kinds of collection nodes. In a so-called "simple" collection node, the wizard sequences through the pages in the collection in a fixed linear fashion. The wizard illustrated in FIG. 3 is an example of a simple collection. In a so-called "branching" collection node, the wizard sequences through a series of pages that define one of a plurality of selectable branches. A so-called "summary" collection node has the same branching behavior as a branching collection node; but whereas the branching collection node terminates by advancing to a subsequent node in the sequence of wizard nodes, the summary collection node will terminate by returning to an initial summary page that was presented by the wizard at the beginning of the branching routine. Again, FIG. 5, to be discussed in turn, clarifies the behavior of these different kinds of collection nodes.

According to a particularly advantageous feature, the navigation module 322 can define the properties of nodes in a static manner or dynamic manner. If defined in a dynamic manner, the navigation module 322 determines the characteristics of the nodes at run-time, as specified by a separate strategy associated with the nodes. Thus, a single node can function in different ways depending on the strategy that is associated with it.

The navigation module 322 also includes history stack logic 326. The history stack logic 326 maintains one or more chronologically ordered lists of the pages that the user has visited in the course of using the wizard in a particular session.

In one implementation, the local page logic 320 and the navigation module 322 represent different functional units implemented on the same machine (e.g., the same computing device). In another implementation, the local page logic 320 and the navigation module 322 represent different functional units implemented on different respective machines. For instance, the navigation module 322 can be implemented on a server-type machine that is accessible to clients (that each implement the local logic 320) via a network coupling Still other configurations are possible, as will be apparent to those skilled in the art.

In operation, the tree navigation logic 324 receives a token from the local page functionality 320. That token includes data that informs the tree navigation logic 324 what kind of interface control the user has activated, such as a "next" button or "back" button. In response, the tree navigation logic 324 advances to an appropriate node in the hierarchical tree.

The technique used to traverse the tree will be described in detail in connection with FIG. 5. However, by way of introduction, the tree navigation logic 324 performs depth traversal of the tree to identify page nodes corresponding to a series of wizard pages. To identify a first node, for instance, the tree navigation logic 324 will advance from a root collection node to a first collection node (if provided). From the first collection node, the tree navigation logic 324 will then move farther down the tree to eventually identify a page node. The page node may be a direct child of the first collection node, a grandchild of the collection node, etc. Upon successive activations of "next" buttons associated with individual pages in the wizard, the tree navigation logic 324 will "walk through" the page nodes of the hierarchical tree in the above-indicated manner. If the user activates a "back" button, the navigation module 322 returns to a previous node. In one exemplary implementation, the navigation module 322 can determine the identity of prior nodes by consulting the history stack logic 326.

Figure 4:
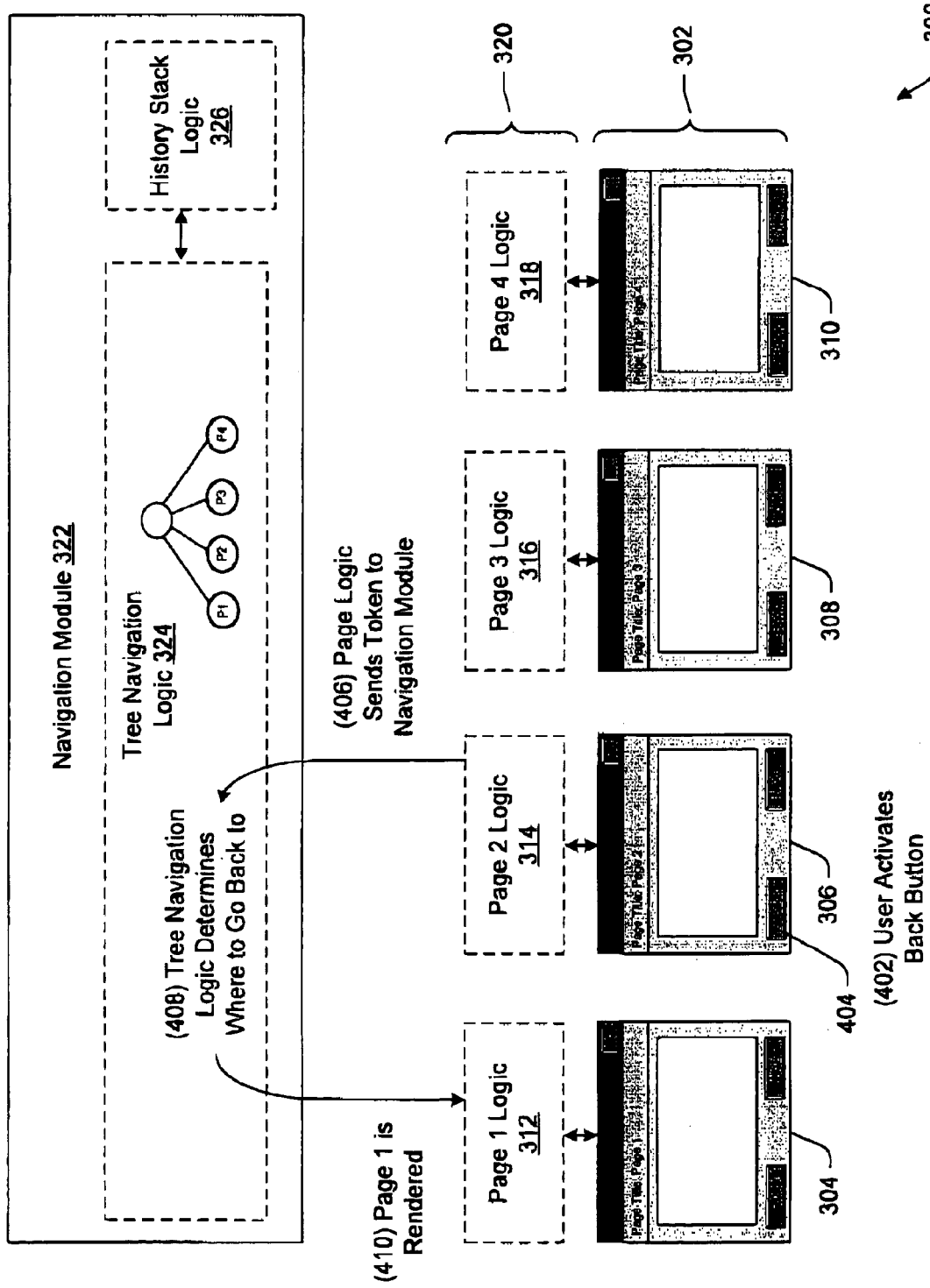
FIG. 4 shows, in the context of the design strategy of FIG. 3, a technique for returning to a previous page upon activation of a "back" button.

FIGS. 3 and 4 also illustrate the operation of the navigation module 322 by showing two different scenarios. In the first scenario of FIG. 3, in step 328, the user activates a "next" button 330 provided by the first page 304. In step 332, the page logic 312 associated with the first page 304 transmits token information to the navigation module 322. This token information identifies that the user has activated the "next" button 330. In step 334, the navigation logic 322 receives the token. On the basis of the token, the tree navigation logic 324 traverses the tree to determine a successor node to be displayed. In step 336, the logic 314 associated with the second page 306 is used to render the second page 306.

FIG. 4 shows the same functionality as FIG. 3, but illustrates the scenario where, in step 402, the user has activated a "back" button 404 associated with the second page 306. In step 406, the logic 314 associated with the second page 306 sends a token to the navigation module 322 that indicates that the "back" button 404 was activated. In step 408, the navigation module 322 determines the immediately prior page visited by the user in the sequence of wizard pages. The navigation module 322 makes this determination by making reference to the history stack logic 326. In this example, it is presumed that the user had most recently visited the first page 304. In step 410, the logic 312 associated with the first page 304 renders the first page 304.

The two scenarios shown in FIGS. 3 and 4 are merely illustrative The navigation module 322, in cooperation with the local page logic 320, can implement additional navigational options. For instance:

(1) In one example, the wizard can incorporate branching behavior. In this case, the user can select one of plural mutually exclusive branches. The navigation module 322 responds to the selection by advancing to a sequence of nodes and corresponding pages associated with the selected branch. FIG. 5 describes branching in greater detail.

(2) In another example, the wizard can be configured to simply skip one or more optional pages. This can be implemented by simply deactivating nodes corresponding to pages to be skipped. In other words, the navigation module 322 can set attributes that define whether a node is active or inactive, which, in turn, determines whether its associated page will be displayed or not. The wizard can also implement node-skipping using branching techniques.

(3) In another example, the wizard can be configured to allow the user to repeat one or more operations. For instance, this may be useful to implement a retry operation after a failed online operation.

(4) In another example, the wizard can be configured to allow the user to perform an operation only once. That is, after the operation is completed, the page that provides this operation is effectively removed from the viewable pages provided by the wizard. In one implementation, the local page logic 320 can perform this function by essentially disabling itself to further activation requests.

The above-described behavior is not exhaustive. That is, wizards can implement additional kinds of behavior not specifically enumerated above.

Exemplary Composition of the Hierarchical Tree

Figure 5:
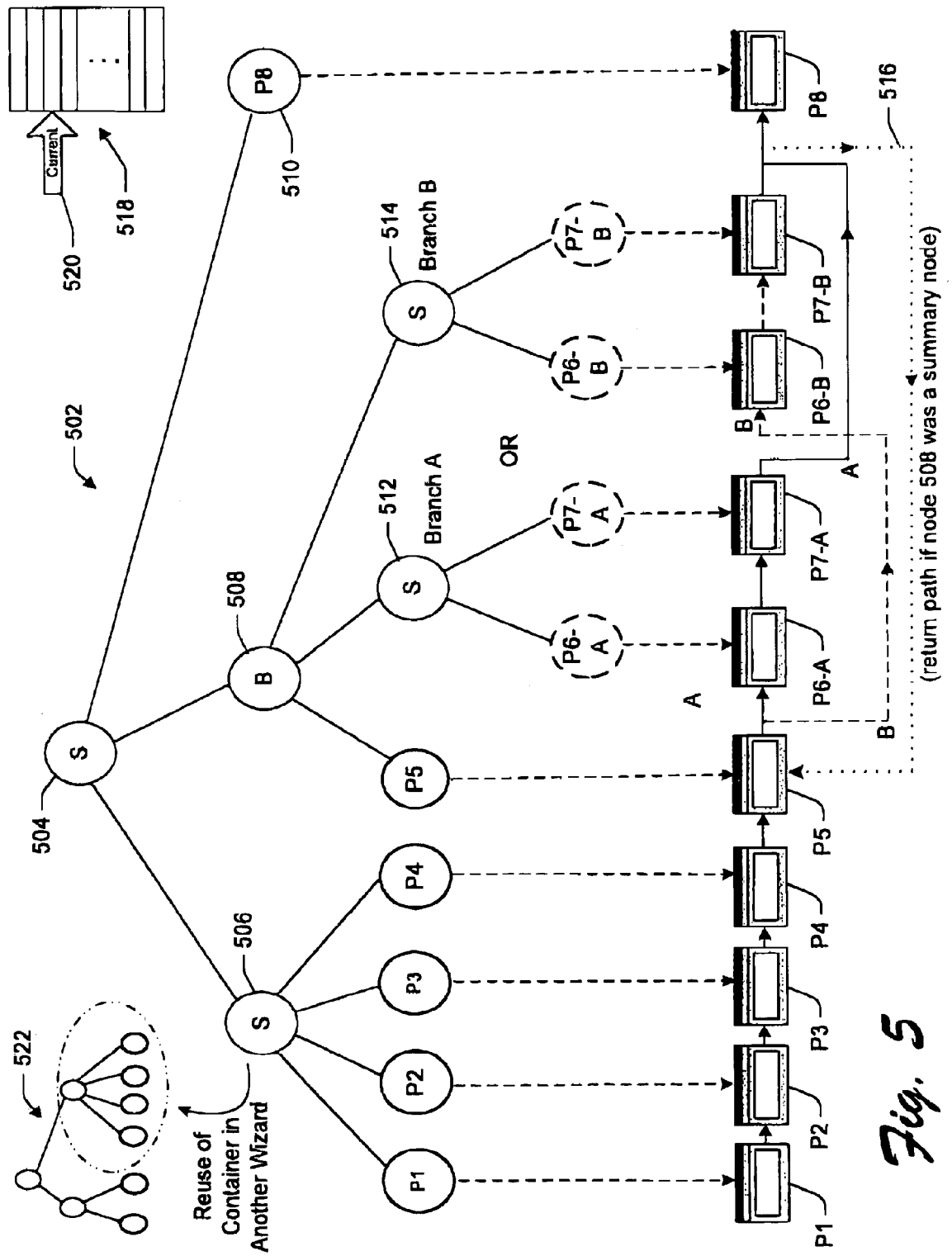
FIG. 5 shows an exemplary navigational tree used in the design strategy of FIG. 3.

With the above introduction, FIGS. 5-8 provide additional details regarding the navigation module introduced in FIG. 3. FIG. 5 particularly illustrates the use of a hierarchical tree 502 to describe a sequence of wizard pages. The hierarchical tree 502 shown in FIG. 5 includes a root collection node 504. The root collection node 504 conceptually represents all of the other nodes and corresponding pages in the wizard. As described above, a hierarchical tree can use different kinds of collection nodes—for instance, a simple collection node (denoted by the symbol "S"), a branching collection node (denoted by the symbol "B"), and a summary collection node (not shown in FIG. 5). The root collection node is a simple collection node. This means that it provides a collection of child nodes to be applied in a fixed linear sequence. The root collection node specifically includes collection node 506, collection node 508, and page node 510 as child nodes.

Collection node 506, in turn, is another simple collection node. Again, this means that children of this node 506 are presented in a fixed linear sequence (e.g., without branching). The children of the simple collection node 506 include page nodes P1, P2, P3, and P4. These page nodes represent individual pages bearing the same labels (P1, P2, P3, and P4). The simple collection node 506 has the same structure and behavior as the hierarchical tree discussed above in connection with FIGS. 3 and 4.

Collection node 508 defines a branching-type collection node. A branching collection node offers multiple mutually selectable branches to the user. When the user selects one of these branches, the navigation module 322 displays the pages associated with this branch. In the illustrative example of FIG. 5, the branching collection node 508 includes three child nodes: page node P5, collection node 512, and collection node 514. The page node P5 can correspond to a user interface page that gives the user the option of selecting one branch out of several identified branches. This can be performed by selecting one radio button out of a list of radio buttons, selecting an item from a menu of items, activating a hypertext link associated with selectable text items, selecting one of a plurality of branch-specific "next" buttons, or any other manner of selection. In the present case, assume that the page corresponding to the page node P5 gives the user the option of selecting between branches A and B. If the user selects branch A, then the navigation module 322 advances to collection node 512 Collection node 512 includes page nodes P6-A and P7-A corresponding to user interface pages having the same names. If the user selects branch B, then the navigation module 322 advances to collection node 514. Collection node 514 includes page nodes P6-B and P7-B corresponding to user interface pages having the same names. All of the page nodes associated with the branching collection node 508 are shown in dashed lines to indicate that they are optional (e.g., that they are not necessarily displayed, but, rather, depend on a branching selection made by the user).

At the termination of either branch A or branch B, the wizard will advance to the next successive node (upon activation of a "next" command). This is the characteristic behavior of the branching collection node 508. However, if the collection node 508 was a so-called summary node, then the branching behavior would remain the same, but the wizard will advance back to page node P5 and its corresponding user interface page upon the completion of the branches. Path 516 shows the navigation path that would be taken upon the completion of the branches in the event that the collection node 508 was a summary-type collection node.

The hierarchical tree 502 can be implemented using a declarative markup language (such as XML) or using a programming technique (such as an object-oriented program language, such as $C^{++}$). In one implementation, the navigation module 322 call statically define the characteristics of the nodes. This can be implemented by statically specifying the properties using either declarative techniques or programmatic techniques. In another implementation, the navigation module 322 can dynamically define the properties of the nodes. This can be implemented by associating a behavior strategy with each of the nodes at run-time. Additional details regarding the dynamic allocation of node roles will be described with reference to FIGS. 7 and 8.

FIG. 5 also shows a history stack 518 provided by the stack history logic 326 shown in FIGS. 3 and 4. The history stack 5 18 has entries corresponding to pages visited by the user in navigating through the hierarchical tree 502. The history stack 518 indicates that the user is currently interacting with a page pointed to by pointer 520. Assume that the stack identifies the current page as "page n," the immediately prior page as "page n-1," the page prior to that as "page n-2," and so on. Among other uses, the navigation module 322 uses the history stack 518 to implement navigation in response to activation of the "back" button. That is, upon activating the "back" button once, the navigation module 322 identifies the page n-1. Upon activating the "back" button again, the navigation module 322 identifies the page n-2, and so on.

In one implementation, the history stack logic 326 removes entries from the history stack 518 when the user activates the "back" button. This means that the history stack 518 no longer provides information that will enable the history stack logic 326 to move forward again through the same sequence of pages. If this "redo" capability is desired, the history stack logic 326 can use another history stack (not shown) that records the path taken in moving backward in the wizard sequence. This secondary stack provides the intelligence to reconstruct the path when it is desired to move in the forward direction again.

Finally, FIG. 5 shows another hierarchical tree 522. This other tree 522 is shown to illustrate that parts of one tree can be "plugged into" other trees. For instance, the collection 506 in tree 502 can be used in the tree 522. Unlike the technology described in the Background section of the present disclosure, this reuse does not require burdensome recoding of the pages used in either the collection 506 or the new tree 522. This is because the pages simply transmit tokens indicating whether a "next" or "back" button was activated (or, in more complex cases, what branching option was activated), but otherwise have no intelligence regarding the larger scope of the tree in which they are being employed. It is the navigation module 322 that provides the hierarchical tree that describes the context in which the pages are employed. This design strategy therefore promotes the modular sharing of pages between different hierarchical trees.

EXAMPLE OBJECT-COMPOSITION OF THE NAVIGATION MODULE

Figure 6:
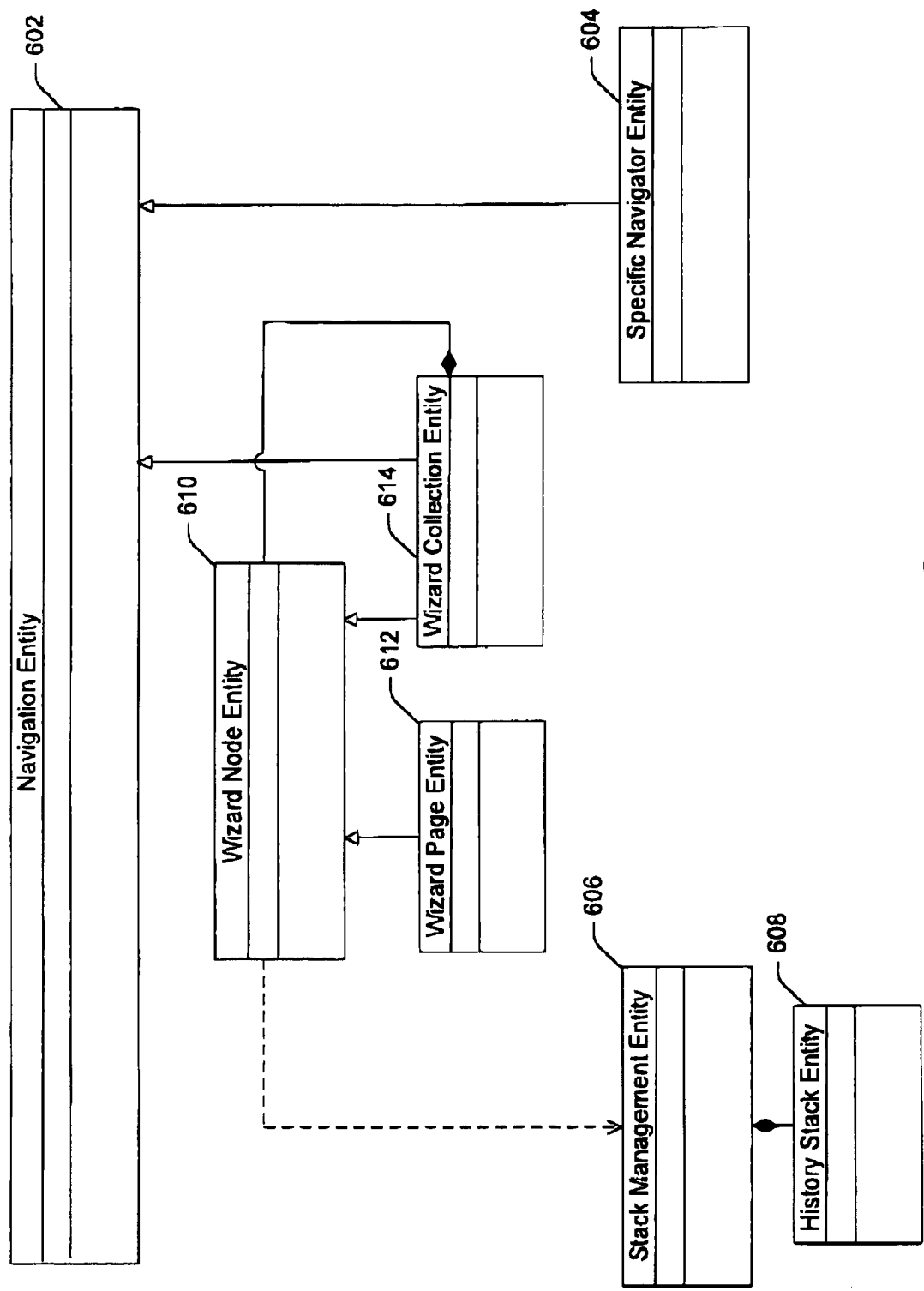
FIGS. 6-8 show exemplary objects that can be used to implement a navigation module used in the design strategy shown in FIG. 3.
Figure 7:
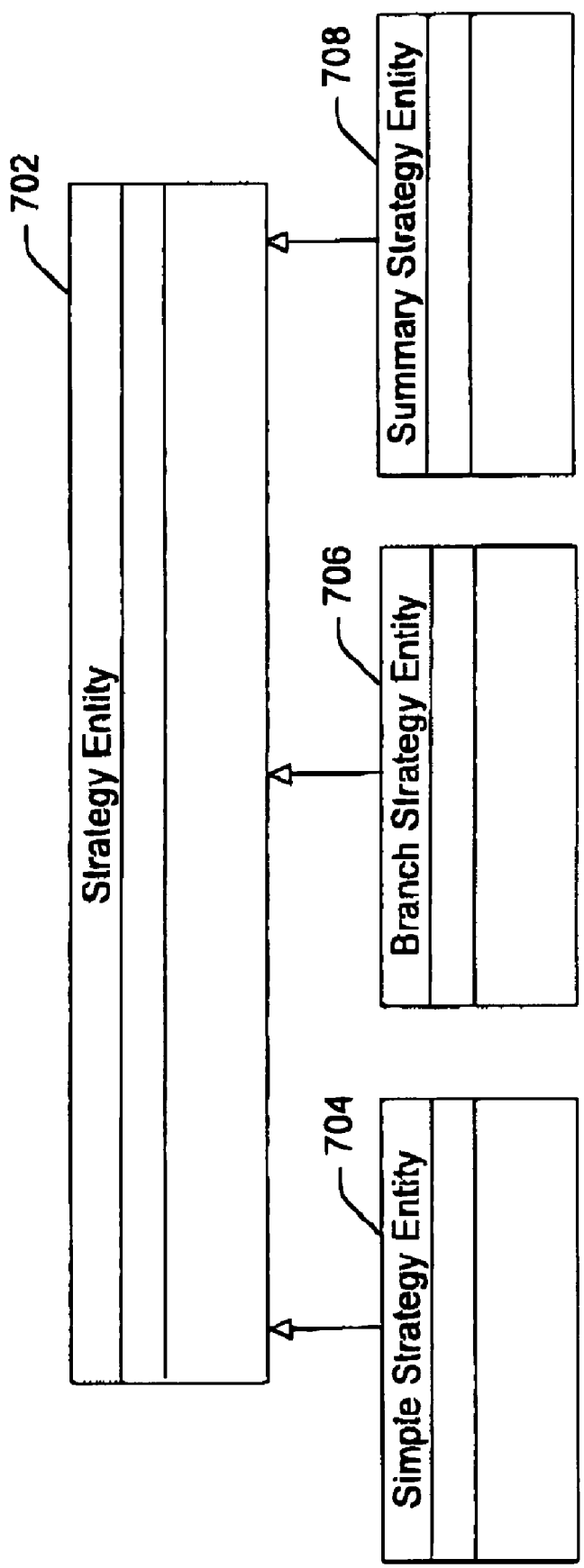
Figure 8:
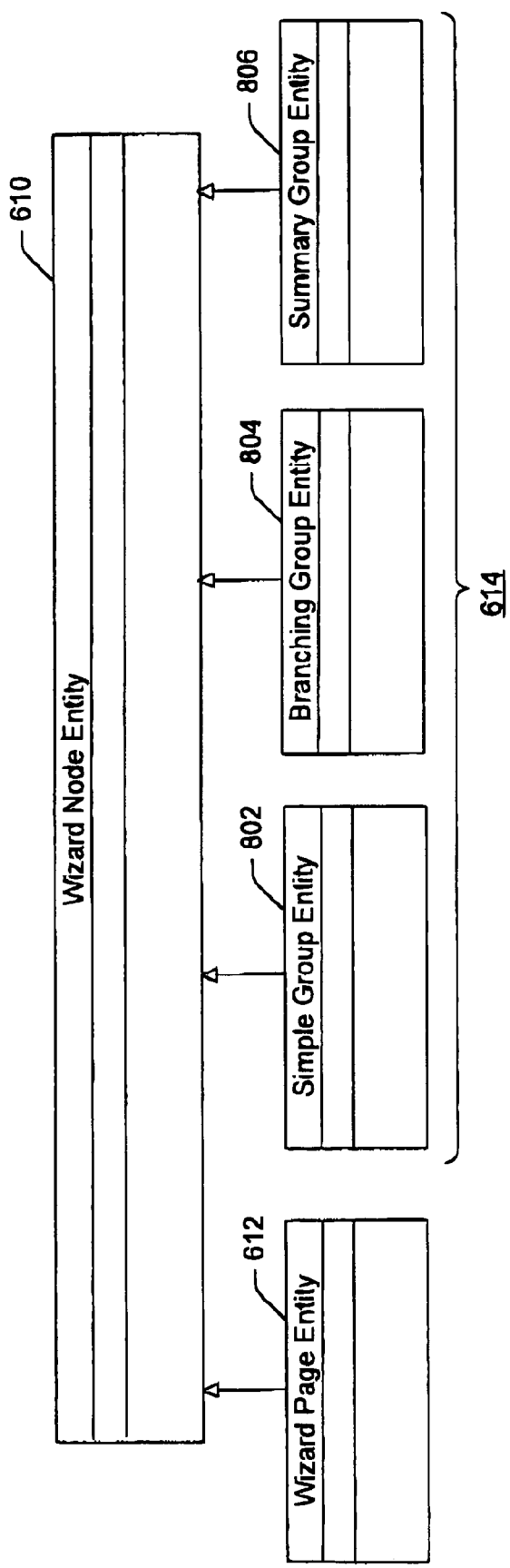

FIGS. 6-8 show an object-oriented description of one exemplary technique for implementing the navigation module 322 introduced in FIG. 3. As is well understood, an object in an object-oriented program includes a set of properties that define its characteristics. One or more methods may encapsulate the properties and provide a means for modifying the values of the properties. The objects may be arranged in a hierarchical relationship. A class object defines a general pattern that describes the properties of any object that is a child of the class object. That is, child objects inherit the properties of their parents. An exemplary object-oriented programming language is $C^{++}$.

In FIG. 6, a navigation entity 602 represents an object that governs certain general aspects of the navigation performed by the navigation module 322. For instance, this entity 602 may define methods for advancing through the tree in response to actuation of a "next" button, "back" button, or a branching selection. A specific navigator entity 604 tailors the general behavior defined by the navigation entity 602 to a specific processing environment, such as a specific processing machine. For instance, the navigation entity 602 may specify general actions to be taken. The specific navigator entity 604 translates these general actions into specific actions that take account for the requirements of a particular processing environment.

A stack management entity 606 coordinates the logging of pages visited by the user in using a wizard. In other words, the stack management entity 606 implements the stack history logic 326 introduced in FIG. 3. A history stack entity 608 corresponds to the history stack 518 introduced in FIG. 5

A wizard node entity 610 generically represents any node found in the hierarchical tree. As mentioned in connection with FIG. 5, a node can assume the character of a page node or a collection node. A page node directly represents a user interface page that can be presented to the user. A collection node represents a collection of other nodes, which may comprise page nodes and/or other collection nodes. Wizard page entity 612 corresponds to the above-described page nodes. Wizard collection entity 614 corresponds to the above-described collection nodes.

As mentioned in connection with FIG. 5, a collection node can assume different behavior. FIGS. 7 and 8 describe this concept. More specifically, FIG. 7 shows different strategies that can be assigned to collection nodes. The different strategies are instances of a general class defined by a strategy entity 702 More specifically, a simple strategy entity 704 defines the behavior that governs the operation of a simple collection of nodes. A wizard using this strategy will sequence through the pages in a fixed linear fashion. A branch strategy entity 706 defines the behavior that governs the operation of a branching collection of nodes. A wizard using this strategy will sequence through a selected branch and then terminate in a downstream terminal page. A summary strategy entity 708 defines the behavior that governs the operation of a summary collection of nodes. A wizard using this strategy will sequence through a selected branch and then return to an initially presented summary page.

FIG. 8 illustrates the effect of applying the above-described strategies to nodes in a hierarchical tree. A portion of this diagram duplicates what was already discussed in connection with FIG. 6. Namely, the wizard Node Entity 610 defines a general class of nodes. A page node 612 and a collection node 614 define two specific kinds of nodes. FIG. 8 elaborates on the nature of the collection node 614 by identifying different kinds of collection nodes—namely, a simple group entity 802 representative of a simple collection of nodes, a branching group entity 804 representative of a branching collection of nodes, and a summary group entity 806 representative of a summary collection of nodes.

The nodes shown in FIG. 8 can be defined in static or dynamic fashion. In the latter case, the nodes can be defined at run-time by applying the strategy objects to the nodes.

Other software and/or hardware mechanisms can be used to implement the functions described above, such as the mechanism described in commonly assigned co-pending U.S. application Ser. No. 10/083,023, filed on Feb. 26, 2002, and entitled, "Page Function Architectural Framework," which is incorporated herein by reference in its entirety. This co-pending application describes page function logic coupled to frame logic. The page function logic can be used to implement the above-described local page logic 320. Page function logic associated with parent nodes and/or frame logic can be used to implement the above-described navigation logic 322.

B. Exemplary Apparatus for Implementing Mapping

Figure 9:
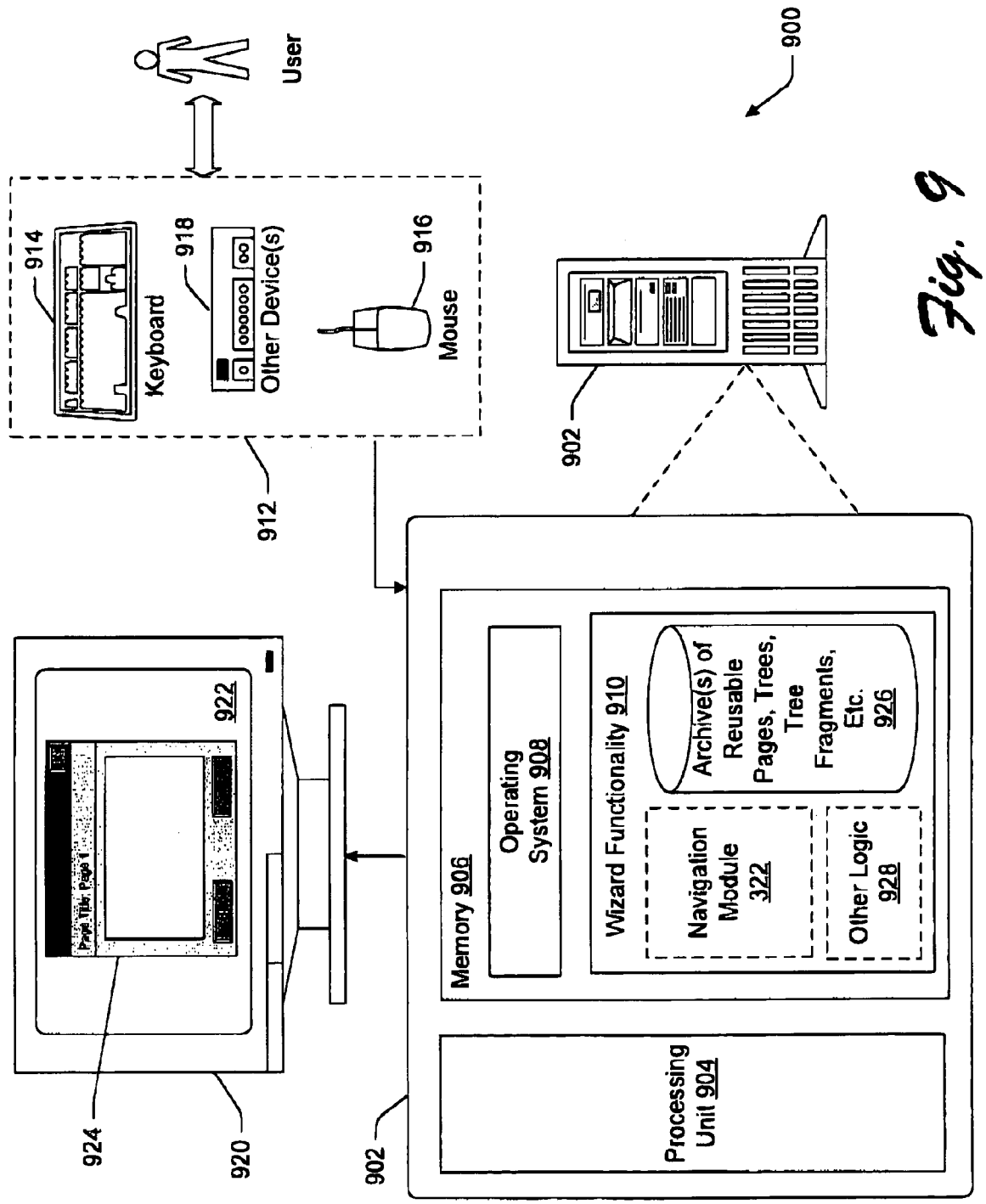
FIG. 9 shows an exemplary apparatus for implementing the design strategy shown in FIG. 3.

FIG. 9 shows an overview of an exemplary apparatus 900 for implementing the design strategy 300 shown in FIG. 3. The apparatus 900 includes a computer 902 that contains one or more processing units 904 and memory 906. Among other information, the memory 906 can store an operating system 908 and functionality 910 for providing wizards. The computer 902 is coupled to a collection of input devices 912, including a keyboard 914, mouse device 916, as well as other input devices 918. A user interacts with the computer 902 via the input devices 912. The computer 902 is also coupled to a display device 920. The display device 920 presents any type of user interface 922, such as a text-based user interface, a graphical user interface, or some other type of user interface. The user interface 922 can be used to display the wizards discussed above in Section A, such as exemplary wizard page 924.

The wizard functionality 910 includes the navigation module 322. The navigation module 322 generally represents a common processing resource that coordinates the display of different wizards by navigating through a hierarchical tree in the manner described above. The navigation module 322 is instantiated when it processes a specific sequence of wizard pages linked together by a specific hierarchical tree of nodes. Pages and trees can be stored in database 926. More specifically, the database 926 can store complete wizards page collections, including information representing the individual pages used to compose the wizard as well as the tree information which links these pages together. In addition, the database 926 can store fragments of wizards in modular fashion, such as the collections 506 and 508 shown in FIG. 5. In other words, these fragments represent collections of pages used to compose only part of a complete wizard, as well as the tree fragments which bind these pages together. In addition, the database 926 can store individual pages that are not uniquely associated with any one wizard. As such, the database 926 can be viewed as an archive that stores different kinds of building components from which wizards can be constructed. The navigation module 322 can draw from this archive of components to compose a wizard for presentation to the user. By virtue of this design, the wizard functionality 910 can use a single page or collection of pages in multiple different wizards. Further, as discussed above, a developer can "plug in" different pages or collections of pages in different wizards without having to make tedious and error-prone modification of the code associated with the individual pages. The wizard functionality 910 thus offers both the design virtues of economy and user-friendliness.

The wizard functionality 910 also includes other logic 928 involved in the presentation of wizards to users.

Figure 10:
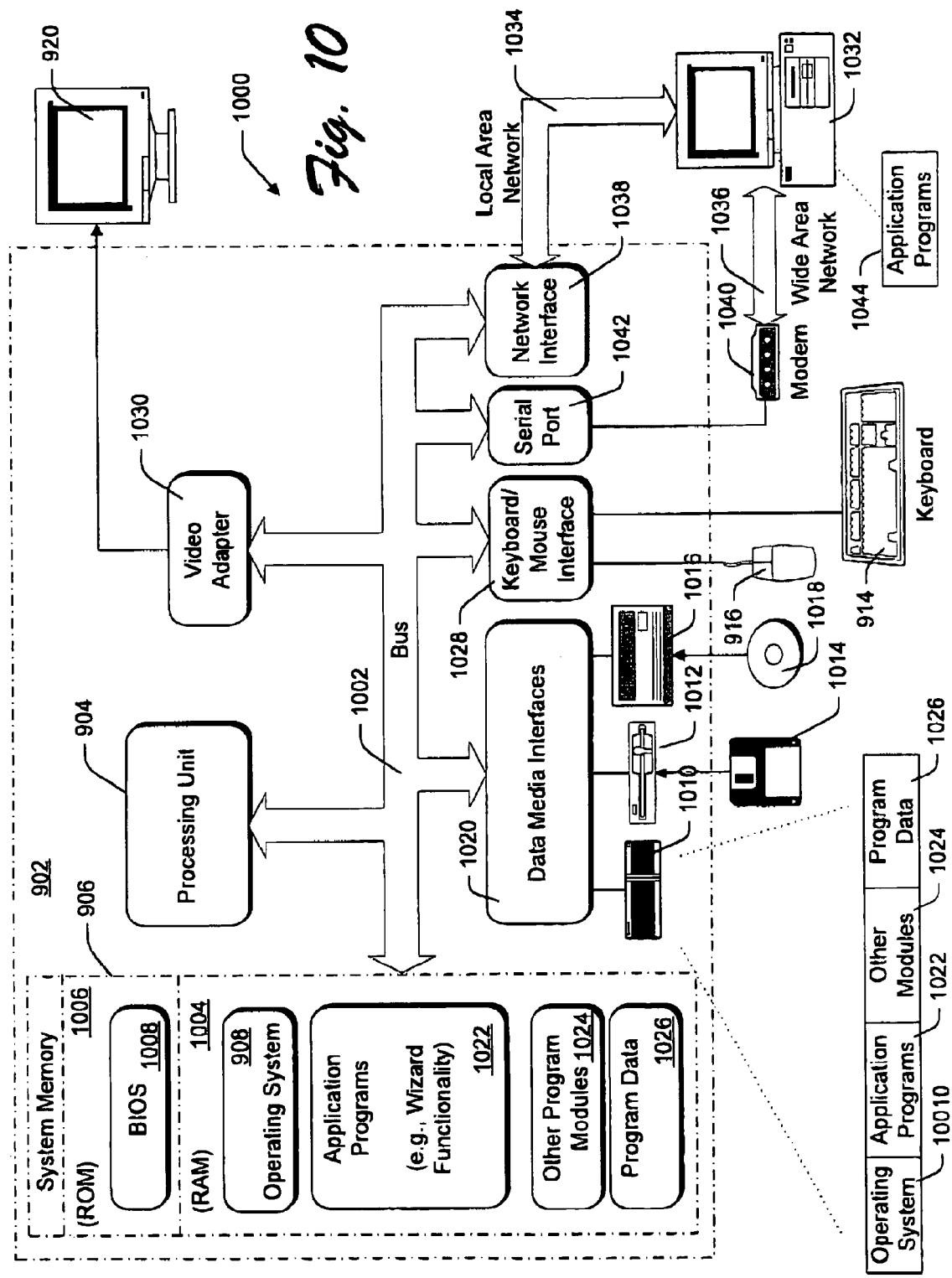
FIG. 10 shows a more detailed depiction of an exemplary computing environment that can be used to implement the apparatus shown in FIG. 9.

FIG. 10 provides additional information regarding computer environment 1000 that can be used to implement the solution described in FIG. 9. The computing environment 1000 includes the general purpose computer 902 and display device 920 discussed in the context of FIG. 9. However, the computing environment 1000 can include other kinds of computer and network architectures. For example, although not shown, the computer environment 1000 can include handheld or laptop devices, set top boxes, programmable consumer electronics, mainframe computers, gaming consoles, etc. Further, FIG. 10 shows elements of the computer environment 1000 grouped together to facilitate discussion. However, the computing environment 1000 can employ a distributed processing configuration. In a distributed computing environment, computing resources can be physically dispersed throughout the environment.

Exemplary computer 902 includes one or more processors or processing units 904, a system memory 906, and a bus 1002. The bus 1002 connects various system components together. For instance, the bus 1002 connects the processor 904 to the system memory 906. The bus 1002 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus Computer 902 can also include a variety of computer readable media, including a variety of types of volatile and non-volatile media, each of which can be removable or non-removable. For example, system memory 906 includes computer readable media in the form of volatile memory, such as random access memory (RAM) 1004, and non-volatile memory, such as read only memory (ROM) 1006. ROM 1006 includes an input/output system (BIOS) 1008 that contains the basic routines that help to transfer information between elements within computer 902, such as during start-up. RAM 1004 typically contains data and/or program modules in a form that can be quickly accessed by processing unit 904.

Other kinds of computer storage media include a hard disk drive 1010 for reading from and writing to a non-removable, non-volatile magnetic media, a magnetic disk drive 1012 for reading from and writing to a removable, non-volatile magnetic disk 1014 (e.g., a "floppy disk"), and an optical disk drive 1016 for reading from and/or writing to a removable, non-volatile optical disk 1018 such as a CD-ROM, DVD-ROM, or other optical media. The hard disk drive 1010, magnetic disk drive 1012, and optical disk drive 1016 are each connected to the system bus 1002 by one or more data media interfaces 1020. Alternatively, the hard disk drive 1010, magnetic disk drive 1012, and optical disk drive 1016 can be connected to the system bus 1002 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 908, one or more application programs 1022 (such as the wizard functionality 910), other program modules 1024, and program data 1026.

The computer environment 1000 can include a variety of input devices. For instance, the computer environment 1000 includes the keyboard 912 and a pointing device 916 (e.g., a "mouse") for entering commands and information into computer 902. The computer environment 1000 can include other input devices (not illustrated), such as a microphone, joystick, game pad, satellite dish, serial port, scanner, card reading devices, digital or video camera, etc. Input/output interfaces 1028 couple the input devices to the processing unit 904. More generally, input devices can be coupled to the computer 902 through any kind of interface and bus structures, such as a parallel port, serial port, game port, universal serial bus (USB) port, etc.

The computer environment 1000 also includes the display device 920. A video adapter 1030 couples the display device 920 to the bus 1002. In addition to the display device 920, the computer environment 1000 can include other output peripheral devices, such as speakers (not shown), a printer (not shown), etc.

Computer 902 can operate in a networked environment using logical connections to one or more remote computers, such as a remote computing device 1032. The remote computing device 1032 can comprise any kind of computer equipment, including a general purpose personal computer, portable computer, a server, a router, a network computer, a peer device or other common network node, etc. Remote computing device 1032 can include all of the features discussed above with respect to computer 902, or some subset thereof.

Any type of network can be used to couple the computer 902 with remote computing device 1032, such as a local area network (LAN) 1034, or a wide area network (WAN) 1036 (such as the Internet). When implemented in a LAN networking environment, the computer 902 connects to local network 1034 via a network interface or adapter 1038. When implemented in a WAN networking environment, the computer 902 can connect to the WAN 1036 via a modem 1040 or other connection strategy. The modem 1040 can be located internal or external to computer 902, and can be connected to the bus 1002 via serial I/O interfaces 1042 other appropriate coupling mechanism. Although not illustrated, the computing environment 1000 can provide wireless communication functionality for connecting computer 902 with remote computing device 1032 (e.g., via modulated radio signals, modulated infrared signals, etc.).

In a networked environment, the computer 902 can draw from program modules stored in a remote memory storage device 1044. Generally, the depiction of program modules as discrete blocks in FIG. 10 serves only to facilitate discussion; in actuality, the programs modules can be distributed over the computing environment 1000, and this distribution can change in a dynamic fashion as the modules are executed by the processing unit 904.

Wherever physically stored, one or more memory modules 906, 1014, 1018, 1044, etc. can be provided to store the wizard functionality 910.

C. Exemplary Method of Operation

Figure 11:
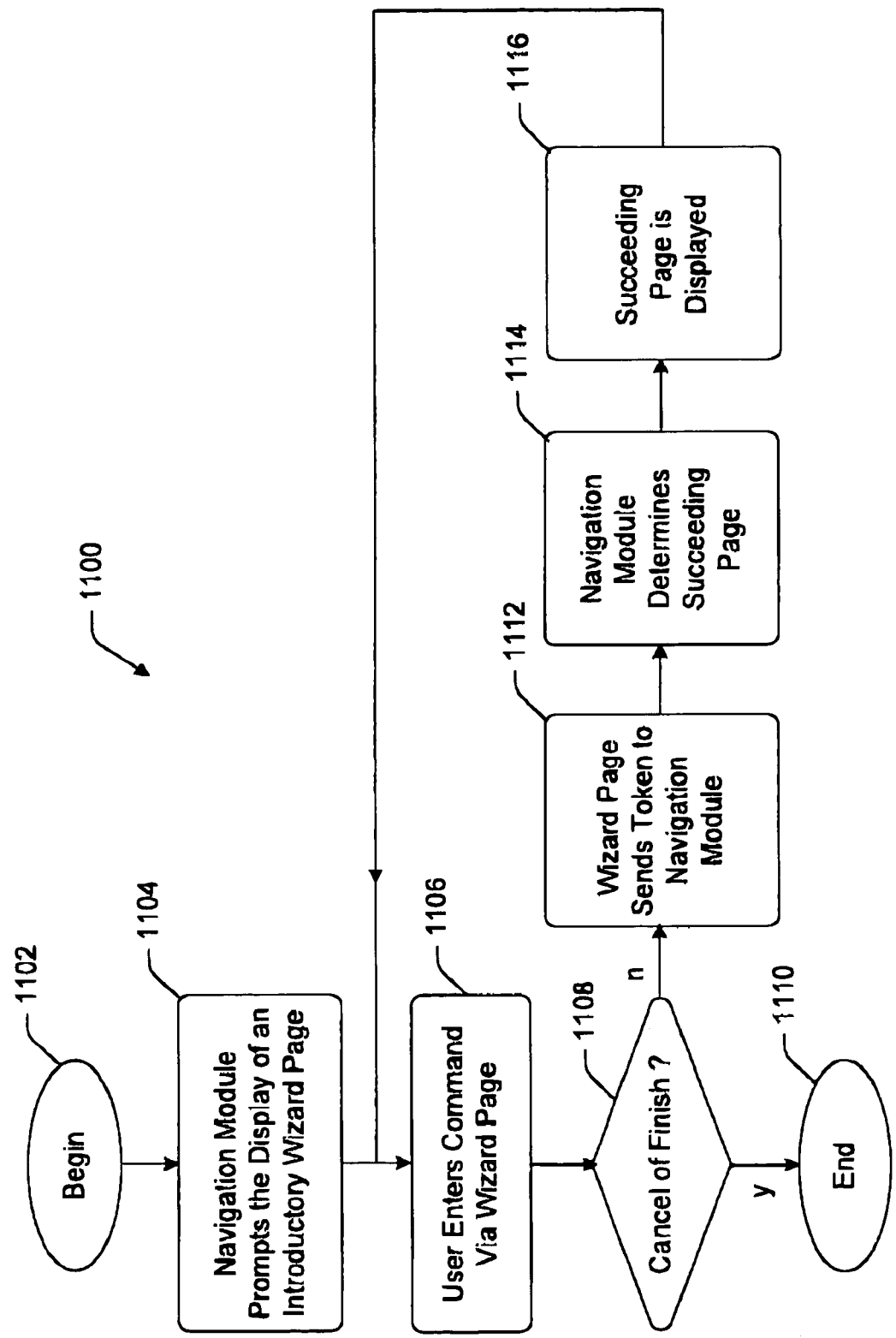
FIG. 11 shows an exemplary procedure for performing navigation in the design strategy shown in FIG. 3.

FIG. 11 shows an exemplary procedure 1100 for performing the wizard functionality illustrated in FIGS. 3-6. To begin with, entity 1102 represents the start of the wizard. The user may expressly request the display of the wizard by entering a command to this effect. Alternatively, other actions taken by the user may automatically activate the wizard. The wizard may include an introductory page. Step 1104 entails displaying this introductory page. More specifically, in one implementation, activation of the wizard causes a "start" token to be forwarded to the navigation module 322. The navigation module 322 responds to the start token by determining what page to display first, and then causing this first page to be displayed. Such an initial page may correspond to an introductory page that provides introductory information.

In step 1106, the user enters a navigational command. As discussed above, common commands include a command to move forward through the wizard in response to the user's activation of a "next" button, and a command to move backward through the wizard in response to the user's activation of a "back" button. A command may also specify that the user wishes to branch to a particular subset of wizard pages. For instance, the command may instruct the wizard to jump to one of a specified number of mutually selectable branch options, or may simply instruct the wizard to skip one or more pages. Pages that may or may not be displayed in the execution of the wizard are referred to as optional pages. The above-described commands are merely illustrative; other wizards may give the user the option of selecting other kinds of navigational options.

Alternatively, the user's command may instruct the wizard to cancel the presentation of the remainder of its pages, or to finish once it has presented a predetermined number of pages. Step 1108 determines whether the user has activated a "cancel" or "finish" command. If so, entity 1110 represents the termination of the wizard presentation routine.

However, if the command is not a "cancel" or "finish" command, then the routine 1100 invokes a procedure for navigating through the wizard pages using a hierarchical tree. This procedure includes a step 1112 in which the local page functionality 320 transmits a token to the navigation module 322 that represents the command that has been entered (e.g., "next," "back," etc.). In step 1114, the navigation module 322 determines what page is to be displayed in response to the token (i.e., the "succeeding page") by traversing the hierarchical tree. In step 1116, the logic associated with the succeeding page is activated to present the succeeding page In one implementation, the local page logic 320 associated with the succeeding page can "refuse" activation by the navigation module 322. In this case, the navigation module 322 may attempt to find another page to activate and display.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An apparatus for presenting a sequence of user interface pages to a user, comprising:
    page logic associated with an initial user interface page, wherein the page logic is configured to:
        detect the user's activation of a control provided by the initial user interface page; and
        form a token representative of the activation of the control; and a navigation module providing a hierarchical tree of nodes representative of the user interface pages in the sequence, wherein the navigation module is configured to:

receive the token from the page logic; and determine another user interface page to present to the user by traversing the hierarchical tree of nodes based on a navigation instruction specified by the token;

prevent display of one or more optionally displayed pages associated with the one or more deactivated nodes, wherein by deactivating a node, one or more associated pages are skipped during page traversal;

determine characteristics of at least one dynamic node at run-time, wherein the characteristics function according to an associated strategy;

display a sequence of pages, and upon termination of the sequence of pages, return to an initial summary page presented by a summary collection node;

wherein at least two branches within the hierarchical tree are mutually exclusive, the exclusivity comprising a logical OR to restrict traversal of the hierarchical tree to be among nodes associated with only a selected branch from among the at least two mutually exclusive branches, thereby preventing future travel among nodes associated with unselected branches among the at least two branches.

2. The apparatus according to claim 1, wherein the control is configured to instruct the apparatus to advance to a next user interface page associated with an appropriate node in the hierarchical tree.

3. The apparatus according to claim 1, wherein the control is configured to instruct the apparatus to advance to a prior user interface page associated with an appropriate node in the hierarchical tree.

4. The apparatus according to claim 3, wherein the navigation module further includes history stack logic configured to record the prior user interface page to provide an indication of the prior user interface page upon activation of the control.

5. The apparatus according to claim 1, wherein the control is configured to instruct the apparatus to advance to one of a plurality of interface pages associated with different respective branching options associated with nodes in the hierarchical tree.

6. The apparatus according to claim 1, wherein the hierarchical tree includes at least one collection node that includes plural children nodes, said at least one collection node and plural children nodes defining a collection of nodes representative of a grouping of user interface pages within the sequence of user interface pages.

7. The apparatus according to claim 6, wherein a behavior of said at least one collection node is governed by a strategy applied to said at least one collection node.

8. The apparatus according to claim 7, wherein the strategy is dynamically applied to said at least one collection node.

9. The apparatus according to claim 7, wherein the strategy defines whether said at least one collection node exhibits a branching behavior or a non-branching behavior.

10. A computer readable medium including machine readable instructions for implementing the page logic and the navigation module recited in claim 1.

11. A method for presenting a sequence of user interface pages to a user, comprising:

detecting the user's activation of a control provided by an initial user interface page within the sequence of user interface pages;

forming a token representative of the activation of the control;

sending the token to a navigation module, wherein the navigation module provides a hierarchical tree of nodes representative of the user interface pages in the sequence and wherein at least two branches within the hierarchical tree are mutually exclusive, the exclusivity comprising a logical OR to restrict traversal of the hierarchical tree to be among nodes associated with only a selected branch from among the at least two mutually exclusive branches, thereby preventing future travel among nodes associated with unselected branches among the at least two branches;

preventing display of one or more optionally displayed pages associated with the one or more deactivated nodes, wherein by deactivating a node, one or more associated pages are skipped during page traversal;

determining characteristics of at least one dynamic node at run-time, wherein the characteristics function according to an associated strategy;

displaying a sequence of pages, and upon termination of the sequence of pages, returning to an initial summary page presented by a summary collection node;

receiving the token at the navigation module; and based on instructions specified by the token, traversing the hierarchical tree to determine another user interface page to present to the user.

12. The method according to claim 11, wherein the control instructs the navigation module to advance to a next user interface page in the sequence of user interface pages.

13. The method according to claim 11, wherein the control instructs the navigation module to advance to a prior user interface page in the sequence of user interface pages.

14. The method according to claim 13, wherein the navigation module determines the prior user interface page by consulting a history stack that contains a list of user interface pages that have been presented to the user.

15. The method according to claim 11, wherein the control instructs the navigation module to advance to one of a plurality of interface pages associated with different respective branching options.

16. The method according to claim 11, wherein the hierarchical tree includes at least one collection node that includes plural children nodes, said at least one collection node and plural children nodes defining a collection of nodes representative of a grouping of user interface pages within the sequence of user interface pages.

17. The method according to claim 16, further comprising defining the behavior of said at least one collection node by applying a strategy to said at least one collection node in a dynamic fashion.

18. The method according to claim 17, wherein the strategy defines whether said at least one collection node exhibits a branching behavior or a non-branching behavior.

19. The method according to claim 11, wherein the sequence of user interface pages defines a first wizard, and wherein the method further comprises providing another sequence of user interface pages that defines a second wizard, wherein the first and second wizards share at least one user interface page in common.

20. A computer readable medium having machine readable instructions for implementing each of the detecting, forming, sending, receiving, and traversing recited in claim 11.

21. A computer readable medium having stored thereon a data structure and instructions, comprising:

a hierarchical tree having nodes that represent a sequence of user interface pages in a wizard including:

at least two mutually exclusive branches, the exclusivity comprising a logical OR to restrict traversal of the hierarchical tree to nodes associated with only one the at least two mutually exclusive branches, wherein selection of one of the at least two mutually exclusive branches results in display of user interface pages associated with nodes with the selected branch and prevents travel among nodes associated with unselected branches among the at least two branches;

one or more deactivated nodes, wherein node deactivation prevents display of one or more optionally displayed pages associated with the one or more deactivated nodes, wherein by deactivating a node one or more associated pages are skipped during page traversal;

at least one dynamic node, wherein characteristics of the at least one dynamic node are determined at run-time and a single dynamic node can function in different ways depending on a strategy associated with it;

a summary collection node, configured to display a sequence of pages, and upon termination of the sequence of pages, to return to an initial summary page presented by the summary collection node;

at least one collection node that defines a collection of user interface pages within the sequence of user interface pages, wherein a behavior of said at least one collection node is defined by a strategy applied to said at least one collection node; and at least one page node that directly represents a corresponding user interface page; and a navigation module configured to allow user navigation between the sequence of user interface pages associated with the hierarchical tree.

22. The computer readable medium of claim 21, wherein the strategy applied to said at least one collection node creates non-branching behavior in the collection of user interface pages.

23. The computer readable medium of claim 21, wherein the strategy applied to said at least one collection node creates branching behavior in the collection of user interface pages.

* * * * *